(12) United States Patent
Tran et al.

(10) Patent No.: US 7,764,671 B2
(45) Date of Patent: Jul. 27, 2010

(54) METHOD AND SYSTEM FOR A MULTI-CHANNEL AUDIO INTERCONNECT BUS

(75) Inventors: Sang Van Tran, Encinitas, CA (US); Keith LaRell Klingler, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1040 days.

(21) Appl. No.: 10/646,833

(22) Filed: Aug. 25, 2003

(65) Prior Publication Data

US 2005/0036508 A1 Feb. 17, 2005

Related U.S. Application Data

(60) Provisional application No. 60/495,127, filed on Aug. 15, 2003.

(51) Int. Cl.
*H04L 12/50* (2006.01)
(52) U.S. Cl. .................. 370/365; 370/384; 370/395.62; 370/493; 370/505
(58) Field of Classification Search ......... 370/362–365, 370/384, 385, 395.62, 486, 489, 493, 503–514; 341/110; 700/121; 710/8, 22; 712/33, 35, 712/41; 375/353–356; 713/400; 381/20–23
See application file for complete search history.

(56) References Cited

U.S. PATENT DOCUMENTS

| 5,889,820 | A | | 3/1999 | Adams | |
|---|---|---|---|---|---|
| 6,006,287 | A | * | 12/1999 | Wakazu | 710/22 |
| 6,205,223 | B1 | | 3/2001 | Rao et al. | |
| 6,957,284 | B2 | * | 10/2005 | Voth et al. | 710/10 |
| 7,088,398 | B1 | * | 8/2006 | Wolf et al. | 348/423.1 |

OTHER PUBLICATIONS

Augo Codec '97 for portable computing: Preliminary Product information CS4205, Feb. 2001, Cirrus Logic-entire document.*
*96 kHz Digital Audio Interface Transmitter: Data Sheet CS8405A*, Cirrus Logic, Nov. 1999, 33 pages.
Sanchez, C. & Taylor, R., *Overview of Digital Audio Interface Data Structures: Application Note AN22*, Cirrus Logic, Feb. 1998, 10 pages.
European Search Report, dated Mar. 10, 2005, for European Patent Application No. 04017519.2, 3 pages.

* cited by examiner

*Primary Examiner*—Ian N Moore
(74) *Attorney, Agent, or Firm*—Sterne, Kessler, Goldstein & Fox P.L.L.C.

(57) ABSTRACT

Provided is a system and method for communicating audio. A method includes transmitting audio information segments on a first signal line, each segment including a format portion representative of audio format modes, and a data portion having audio data corresponding to one or more of the format modes. The method also includes transmitting a number of synchronization markers on a second signal line. Each marker is representative of a timing of one of the audio information segments.

17 Claims, 7 Drawing Sheets

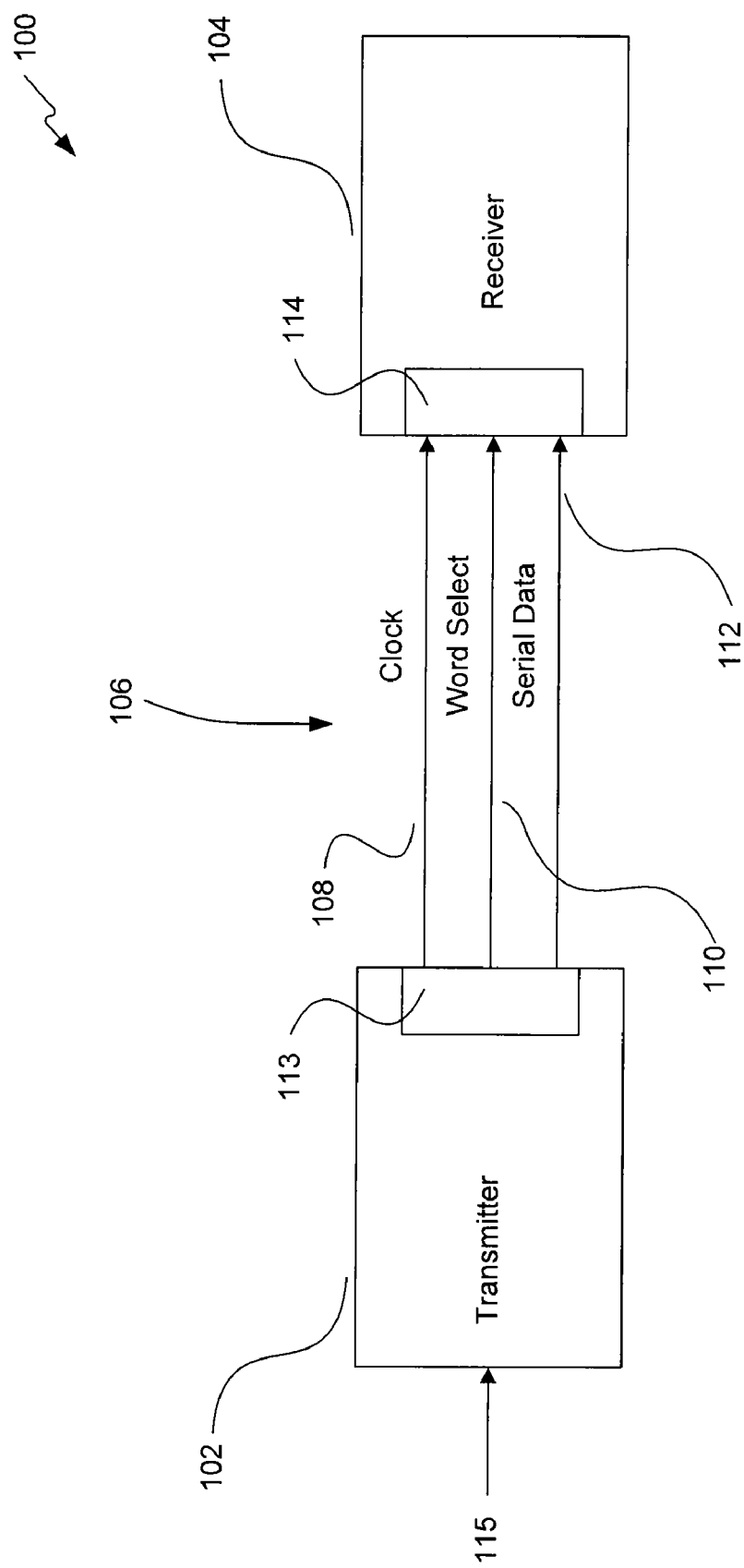
FIG. 1
(Conventional)

| Bits | Mnemonic | Description |
|---|---|---|
| 3:0 | Version | MAI Bus version ID. |
| 7:4 | Audio Stream ID | Indicates which stream the current burst belongs to. |
| 15:8 | Audio Sampling Rate | 0: Not indicate<br>1: 8 kHz<br>2: 11.025 kHz<br>3: 12 kHz<br>4: 16 kHz<br>5: 22.05 kHz<br>6: 24 kHz<br>7: 32 kHz<br>8: 44.1 kHz<br>9: 48 kHz<br>10: 64 kHz<br>11: 88.2 kHz<br>12: 96 kHz<br>13: 128 kHz<br>14: 176.4 kHz<br>15: 192 kHz<br>16-255: Reserved |
| 23:16 | Audio Format | 0: Idle<br>1: Mono<br>2: Stereo. Audio samples are in the order of Left, Right<br>3: Three audio channels in the order of Left, Right, Center<br>4-5: Reserved<br>6: 5.1 format. Audio samples are in the order of Left, Right, Center, Surround Left, Surround Right, LFE<br>7-253: Reserved<br>254: SPDIF linear PCM in stereo mode<br>255: SPDIF in nonlinear PCM format |
| 28:24 | Sample Width | Size of each sample in bits. |
| 31:29 | Reserved | |

FIG. 3

METHOD AND SYSTEM FOR A MULTI-CHANNEL AUDIO INTERCONNECT BUS

CROSS-REFERENCE TO RELATED APPLICATIONS

This application claims the benefit of U.S. Provisional Application No. 60/495,127, filed Aug. 15, 2003, which is incorporated herein by reference.

BACKGROUND OF THE INVENTION

1. Field of the Invention

The present invention relates to protocols used to transfer audio data from one module to another module within a printed circuit board (PCB) or an integrated circuit (IC).

2. Related Art

Traditional processing of audio signals transferred between audio modules within a PCB or an IC typically requires conversion of the related audio signals to an inter-IC sound ($I^2S$) standard or a similar format.

A variety of products are commercially available that utilize audio data, especially at the PCB and IC levels. These products can include set top cable boxes, compact disk players, digital audio tape devices, digital sound processors, and digital televisions, etc. The digital audio signals processed within these systems are shared between numerous PCBs and ICs. During processing, audio signals are shared between internal components within the PCBs or ICs. These components can include, for example, analog-to-digital converters (ADCs), digital-to-analog converters (DACs), error correction devices, digital filters, digital input/output (I/O) interfaces, and the like.

$I^2S$ is one technique intended to standardize the format of audio data transferred between these internal components. $I^2S$ also defines a structure for a data bus used to transport this audio data. With $I^2S$, a line serial bus is used to transfer the audio signals from one component, or module, to another. In $I^2S$, a 3-line serial bus (as opposed to a greater number of lines) is used to minimize the number of pins required on the IC and to keep wiring simple. This 3-line serial bus includes a line for 2 time-multiplexed data channels, a word select line, and a clock line.

PCB and IC level components implementing the widely accepted $I^2S$ standard must therefore convert all incoming audio data signals into the $I^2S$ format. The conversion enables the audio data signals to be transmitted across the 3-line serial bus. As the speed at which micro-electronic large scale integrated (LSI) devices operate increases, the time required to perform the $I^2S$ conversion becomes a critical system limitation. The chip space required to accommodate the three $I^2S$ pins has become equally burdensome. Although other serial data bus designs are available, even some with 1-line data links, most are too complex or lack sufficient flexibility for extensive use.

What is needed therefore is a data bus that can be used to transfer audio data that minimizes the complexities and amount of hardware required for transferring this audio data between PCB and IC modules. What is also needed is a suite of protocols to support this new bus in order to more efficiently transfer data between the modules, ultimately reducing the number of chip pins.

SUMMARY OF THE INVENTION

Consistent with the principles of the present invention as embodied and broadly described herein, an embodiment of the present invention includes a method for communicating audio. The method includes transmitting audio information segments on a first signal line, each segment including a format portion representative of audio format modes and a data portion having audio data corresponding to one or more of the format modes. The method also includes transmitting a number of synchronization markers on a second line. Each marker is representative of a timing of one of the audio information segments.

The present invention eliminates the need for an extra conversion from or to the $I^2S$ format, and thus reduces the number of clock domains and the number of interconnect wires between IC modules.

Further features and advantages of the present invention as well as the structure and operation of various embodiments of the present invention, are described in detail below with reference to the accompanying drawings.

BRIEF DESCRIPTION OF THE FIGURES

The accompanying drawings, which are incorporated in and constitute part of the specification, illustrate embodiments of the present invention and, together with the general description given above and detailed description of the embodiments given below, serve to explain the principles of the invention. In the drawings:

FIG. 1 is a block diagram of a serial link data system;

FIG. 3 is a tabular illustration of exemplary protocols used to transfer multi-channel audio data within the system of FIG. 2;

DETAILED DESCRIPTION OF THE PREFERRED EMBODIMENTS

Figure 2:
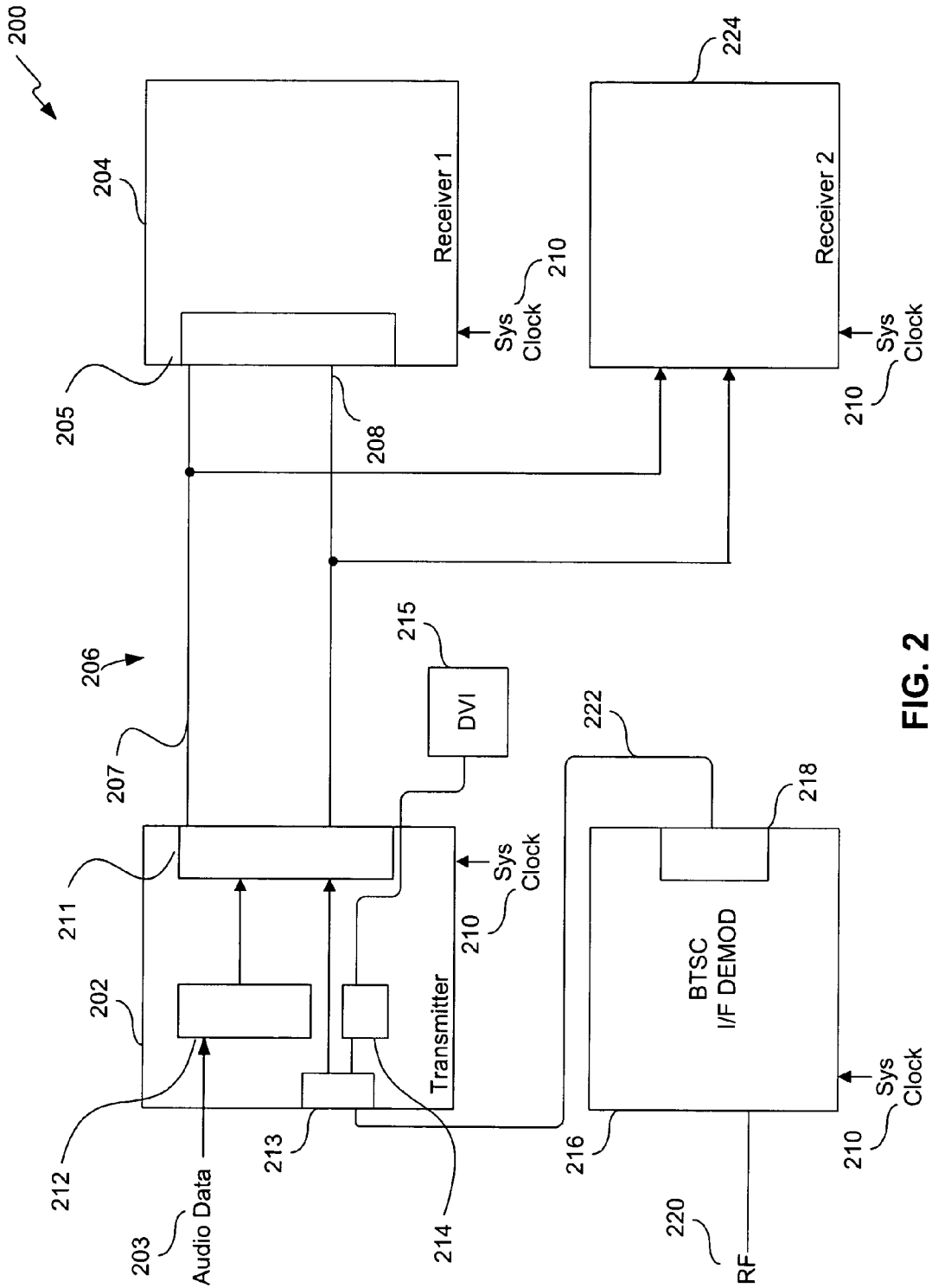
FIG. 2 is a block diagram illustration of a system structured and arranged in accordance with an embodiment of the present invention.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one skilled in the art that the present invention, as described below, may be implemented in many different embodiments of hardware, software, firmware, and/or the entities illustrated in the drawings. Any actual software code with the specialized, controlled hardware to implement the present invention is not limiting of the present invention. Thus, the operation and behavior of the present invention will be described with the understanding that modifications and variations of the embodiments are possible, given the level of detail presented herein.

FIG. 1 is a block diagram illustration of a system 100 used to facilitate an audio connection between modules within an IC. The system 100 includes a transmitter 102 and a receiver 104 respectively configured for transmitting and receiving audio-related data signals. The transmitter 102 and the receiver 104 provide interconnections for modules within PCB and/or IC-based components such as digital signal processors, digital filters, and digital input/output interfaces, also noted above.

In FIG. 1, the transmitter 102 and the receiver 104 are connected by a serial data bus 106. The serial data bus 106 includes a clock line 108 for transferring timing information between the transmitter 102 and the receiver 104. In the system 100, the transmitter 102 generates a bit clock signal along the clock line 108. The transmitter 102 also includes a word select signal 110 and a serial data stream 112. In more complex systems, there may be several transmitters and several receivers.

As shown in FIG. 1, the system 100 includes the 3-line data bus 106 for transferring input audio information 115 between the transmitter 102 and the receiver 104. In order to accommodate this information transfer, the $I^2S$ protocol suite is used for formatting the clock bit data transferred along the clock line 108, the word select data 110, and the serial data stream 112.

The transmitter 102 of FIG. 1 includes a standard audio encoder 113 configured for converting received data 115 into a format for transfer across the data bus 106. The receiver 104 includes a conventional audio decoder 114 configured to decode the encoded audio data received via the data path 106. The encoder 113 can be used, for example, to convert received audio PCM data into an $I^2S$ format or the popular Sony/Philips digital interface (SPDIF) format.

$I^2S$ systems are suitable for a variety of applications. However, $I^2S$-based systems can include many different hardware configurations and protocol variations. Accommodating these variations and differences can lead to an introduction of errors during chip design. These design errors can include left/right swaps, overflow, and left/right phase mismatches. The $I^2S$ approach also defines a clock locked to the data rate as part of the interface, thus complicating silicon clock networks. Additionally, as also noted above, an $I^2S$ conversion is required of all incoming audio data in order to facilitate transfer of data along the data path 106 between the transmitter 102 and the receiver 104.

Accordingly, the present invention is directed to improved methods and systems. FIG. 2 is an illustration of an exemplary system 200 structured and arranged in accordance with an embodiment of the present invention. The system 200 includes a 2-line serial multi-channel audio interconnect (MAI) data bus. In general terms, the 2-line MAI bus of FIG. 2 can be used to transfer digitized data samples of any audio data rate, or a compressed audio bit stream of any rate, providing it is clocked at a sufficiently high frequency. Therefore, the clock rate of the multi-channel audio interconnect bus of the system 200 does not need to be locked to a specific data rate. The MAI bus of the system 200 eliminates the need to convert to the $I^2S$ format, and thus reduces the number of clock domains. Consequently, the number of data lines can be reduced from 3 to 2.

In more specific terms, the communication system 200 includes a transmitting module 202 structured to receive input audio data 203. A receiver 204 is also included. The receiver 204 includes a MAI decoder 205 structured to decode MAI-encoded input audio data. A MAI data bus 206 provides a connection between the transmitting module 202 and the receiver 204. The MAI data bus 206 includes a synchronization line 207 and a data line 208. The synchronization line 207 is structured for transmitting a synchronization (sync) pulse between the transmitting module 202 and the receiver module 204. This sync pulse acts as a timing trigger to control the clocking of data transmitted along the data line 208. In the system 200, all system timing is based upon a system clock input 210 generated by a system clock (not shown).

The transmitting module 202 includes an MAI encoder 211 configured to convert data, requiring transmission, into an MAI protocol format. The transmitting module 202 may also optionally includes a standard audio decoder 212. The audio decoder 212 can be, for example, a demodulator, or some other device to convert the received input audio data 203 into a more conventional processing format. The more conventional format can include, for example, baseband pulse code modulated (PCM) form. The transmitter 202 can also optionally include an MAI decoder 213 to translate any incoming MAI data, transferred along another MAI bus into the transmitting module 202.

Also optionally included is another signal processing module 214 that can be used, for example, to convert data into a predetermined digital format. For purposes of illustration, the output of the MAI decoder 213 can be provided to the MAI encoder 211 and/or to an exemplary digital video interface device (DVI) 215. The operation of the transmitting module 202, and the receiver 204, with regard to the data bus 206, is described below.

The system 200 optionally includes a broadcasting television system committee (BTSC) intermediate frequency (I/F) demodulation device 216. The BTSC device 216, for example, can include an MAI decoder 218. During operation, the BTSC device 216 receives an RF signal 220 as an input, demodulates the received RF input, and encodes corresponding demodulated data into an MAI format for transmission across an MAI bus 222 as an input by the transmitter 202. The system 200 also optionally includes additional destination devices such as an additional receiver 224, configured to receive audio information based upon the MAI protocols.

FIG. 3 provides a tabular illustration 300 of exemplary MAI protocols associated with transmitting audio data via the MAI data bus 206. For purposes of illustration only, the protocols are structured in the form of a 32 bit format data word. The table 300 includes a description section, illustrating modes of the data MAI protocols and a mnemonic section corresponding to the illustrated modes. Also included is a bit section identifying exemplary bits used to configure the data word to corresponding modes.

More specifically, the exemplary data word protocols illustrated in the table 300 include a MAI bus version identification number segment 302, an audio stream ID 304, and an audio sampling rate segment 306. The table 300 also includes an audio format segment 308 to indicate whether the transmitted data is mono, stereo, surround sound, or other audio format. A sample width segment 310 is included along with a reserved section 312 for future capabilities.

The version mnemonic 302, for example, can track a specific kit version for mapping with data. The audio stream ID 304 can be used to represent a multilingual transmission, musical versions, ratings of musical versions, or can be used to indicate data streams to be received by different destination sources. For example, one audio stream ID can be used to indicate a data transmission to be received by the receiver 204 and another transmission to be received by the receiver 224. The audio format portion 308 can be used to define a data format. The audio format portion 308 can also be used to convert the audio data into a form that resembles a conventional audio data transmission.

Figure 4:
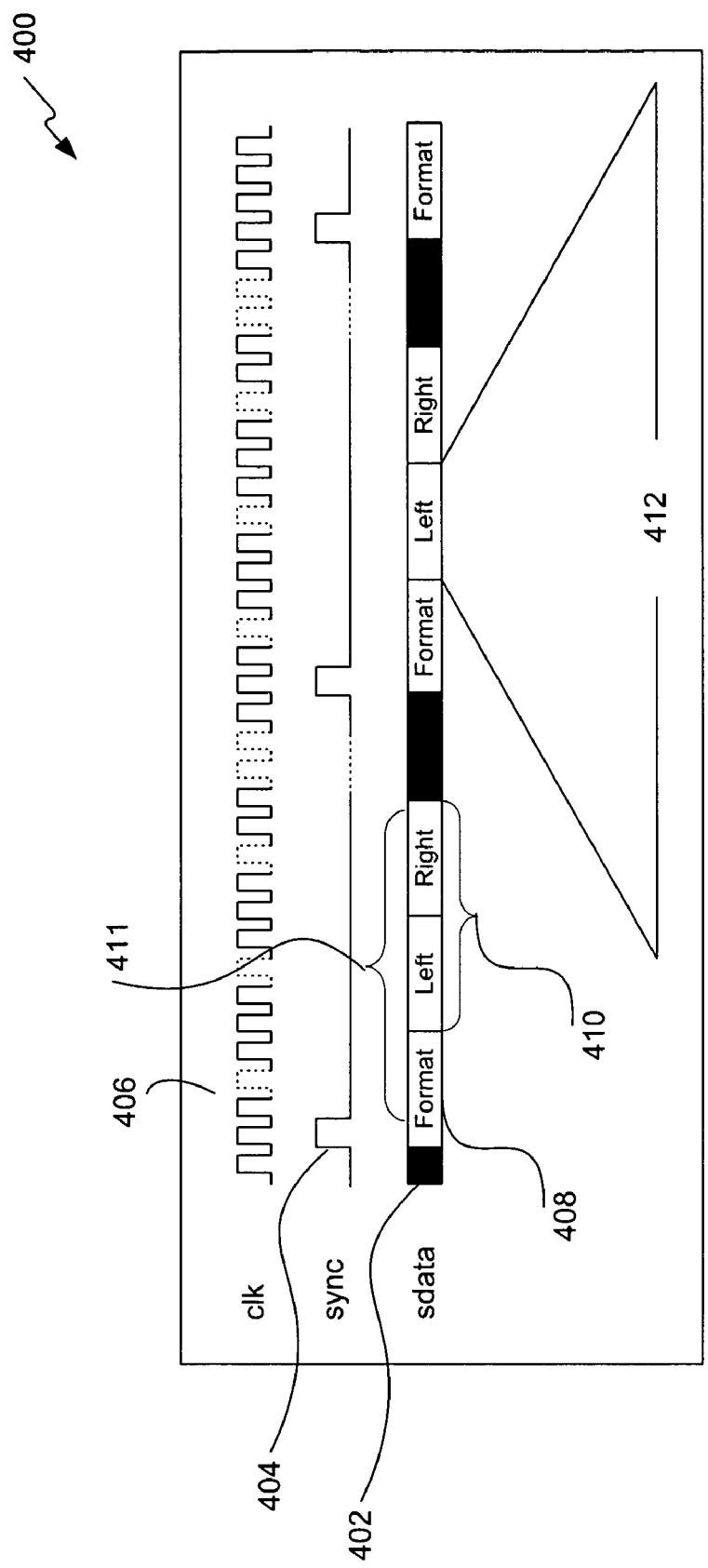
FIG. 4 is an illustration of an exemplary timing diagram of stereo data segments structured in accordance with an embodiment of the present invention.

FIG. 4 is an illustration of an exemplary format 400 for transmitting audio information segments 402 using the MAI bus 206 or 222 of FIG. 2. The audio information segments 402 can be transmitted along the data line 208 or the data path 222 of FIG. 2. An exemplary synchronization pulse stream 404 is transmitted across the sync line 207 to provide timing for the audio information segments 402. A clock signal 406 is generated by a system clock, produces the clock input 210. The clock input 210 is provided to 202, 204, 216 and 224. Although the system 200 can operate at any clock rate, a suitable system clock rate is 108 MHz. At this clock rate, the MAI bus 206 and the MAI bus 222 of FIG. 2 can support up to 35 audio channels of 96 KHz sampling rate with 32 bit resolution. This rate is also sufficient to accommodate standard 5.1 surround sound audio channels and accommodate future expansion.

The audio information segments 402 include a format portion 408 and a data portion 410. The format portion 408 is structured and arrayed in accordance with the table 300 of FIG. 3. The data portion 410 includes exemplary left and right channels representative of a stereo audio data transmission. In traditional communications parlance, the data portion 410 is referred to as a group of samples (GOS), including a left sample and a right sample. The format portion 408 and the GOS 410 are indicative of one information audio segment, or a single data burst 411.

Each synch pulse within the synch pulse train 404 defines the start of each information segment. The format portion 408 and the data portion 410 are transmitted contiguously in substantial synchronism with one of the sync pulses 404. The audio sampling rate field of the format portion 408 can be set for example to 32, 44.1, or 48 KHz, or any other rate indicated within the audio sampling rate mnemonic 306 of FIG. 3.

As a matter of procedure, the data burst 411 is transmitted as soon as the left/right sample pair are available. By transmitting, for example, PCM samples as soon as they are available, the delay, between when the sample is available in the transmitter and when the sample is played in the receiver, will be minimized.

Figure 5:
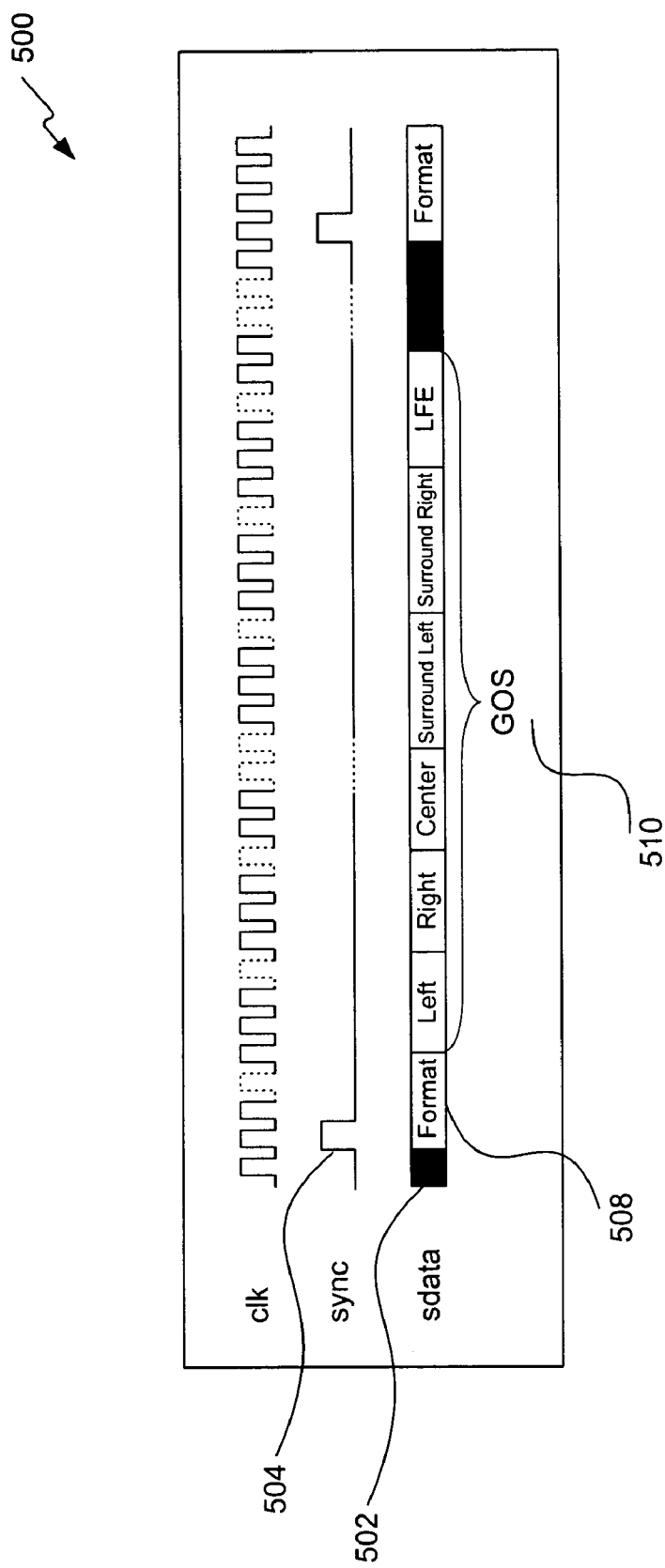
FIG. 5 is a exemplary timing diagram of a multi-channel data segment structured in accordance with the present invention.

The MAI encoder 211 and the MAI decoder 205, in the exemplary embodiment of FIG. 2, are software-programmable and can change formats and location timing of the synch pulses 404 in real-time, in accordance with the audio format word 308. The format 400 of FIG. 4 is one example of a source (transmitter) to destination (receiver) formatting of audio data in accordance with the MAI protocols shown in FIG. 3. FIG. 5, however, is an illustration of another source to destination formatting example.

In FIG. 5, a multi-channel format 500 includes audio information segments 502 and a synchronization pulse train 504. In the example of FIG. 5, the information segments 502 include a format portion 508 and a GOS 510 representative of surround sound audio data. Although the examples of FIG. 4 and FIG. 5 illustrate stereo and surround sound audio data transmissions respectively, the present invention can accommodate any existing audio format and includes flexibility to accommodate expansion.

The operation of the communication system 200 of FIG. 2 will now be described in greater detail. In the example of FIG. 2, the audio data 203 is received as an input to the transmitting module 202 for transmission across the MAI bus 206 to the receiver 204 for playback. As noted above, the transmitting and receiving modules 202 and 204 respectively, can be positioned within a PCB or within an IC. The received audio data 203 is optionally decoded within the audio decoder 212 and is provided as a baseband data signal input to the MAI encoder 211. The system clock input 210 acts as a timing mechanism for modules within the system 200. The MAI encoder 211 converts the baseband data signal into audio information segments, such as the segment 402, illustrated in FIG. 4.

Each of the segments 402 typically includes one format portion 408 and GOS 410. In accordance with the exemplary formats 300 of FIG. 3, the format portion 408 is set within the audio encoder 211. More specifically, the format word 408 is configured in accordance with characteristics of the received audio data 203. These characteristics are assessed within the MAI encoder 211. Each of the format modes 302-310 are configured and set in accordance with predetermined communications modes. The communications modes can be set apriorily or dynamically in accordance with the received audio data 203. The resulting audio information segments 402 are then transmitted across the data line 208 as soon as the first group of samples 410 have been encoded by the encoder 211. Transmission of each data burst 411 occurs in synchronism with one of the sync pulses 404, generated along the sync line 207.

The most significant bit (MSB) of the format portion 408 is aligned with a leading edge of its corresponding synch pulse in order to commence transmission of the data burst 411. The audio information segments 411 are then transmitted along the MAI bus 206 and received by the MAI decoder 205 within the receiver 204. Alternatively, a different receiver 224 can be configured to also receive the audio information segments 402 transmitted along the MAI bus 206. The audio stream ID 302 can be encoded to forward one portion of the audio information segments 402 to the receiver 204 and another portion to the receiver 224.

As stated above, the present invention provides a 2-line serial MAI bus 206 for transmission of audio data. Two lines provide a more efficient transmission system than conventional 3-line systems and is less complex than 1-line systems. The 2-line system of the present invention also provides for a reduced IC pin count and avoids the protocol and software complexities of single line serial data systems.

Additionally, audio data is received as an input RF data signal 220 within the BTSC I/F demodulator 216. Here, the RF signal 220 is encoded with the MAI protocols in the encoder 218 and configured for transmission along the MAI bus 222 to the transmitting module 202. The optional MAI decoder 213 is structured to convert the input MAI encoded data, received via the MAI bus 222, into a secondary data format such as baseband PCM. The data can then be provided to an optional processor 214 such as a DAC, and at the same time provided to the DVI 215 for forwarding to yet another destination component (not shown).

Additionally, the data received from the MAI bus 222, and within the MAI decoder 213, is forwarded directly to the MAI encoder 211 for transmission across the MAI bus 206 to one or both of the receiving modules 204 and 224.

Although the transmitting module 202 is shown to include the MAI encoder 211, the audio decoder 212, the MAI decoder 213, and an optional signal processing component 214, many different combinations of MAI compatible components can be included within the transmitter 202. Similarly, many different embodiments of the receivers 204 and 224 can be used within the context of the present invention.

Figure 6:
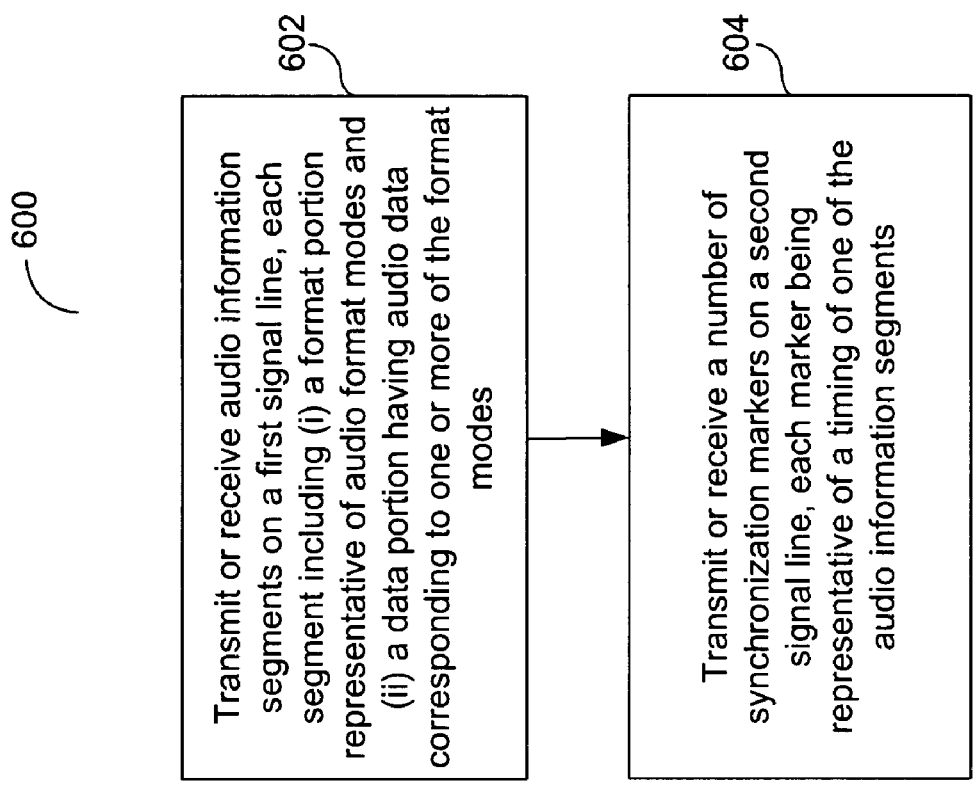
FIG. 6 is a flowchart of an exemplary method of practicing the present invention.

FIG. 6 is an exemplary method 600 of practicing the present invention. In FIG. 6, audio information segments are transmitted or received on a first signal line, as indicated in block 602. A data portion includes audio data corresponding to one or more of the format modes, noted above. Next, a number of synch markers is correspondingly transferred or received on a second signal line, as indicated in block 604.

Each marker is representative of a timing of one of the audio information segments.

The technique of the present invention provides an efficient technique for transferring audio data between modules within a PCB and/or an IC. The present technique provides a protocol for transferring this data using a 2-line data bus that can be used to transfer digitized samples at any audio rate, or a compressed audio bit stream of any rate, providing it is clocked at an appropriate high frequency. The clock rate of the MAI bus of the present invention need not be locked to the data rate. A sync pulse indicates the start of the transfer of a data burst of a group of samples. Following a 32-bit format word that defines specific formats regarding the data to be transferred, the data samples are transferred and the bus remains idle until the next group of samples is ready to be transmitted.

Figure 7:
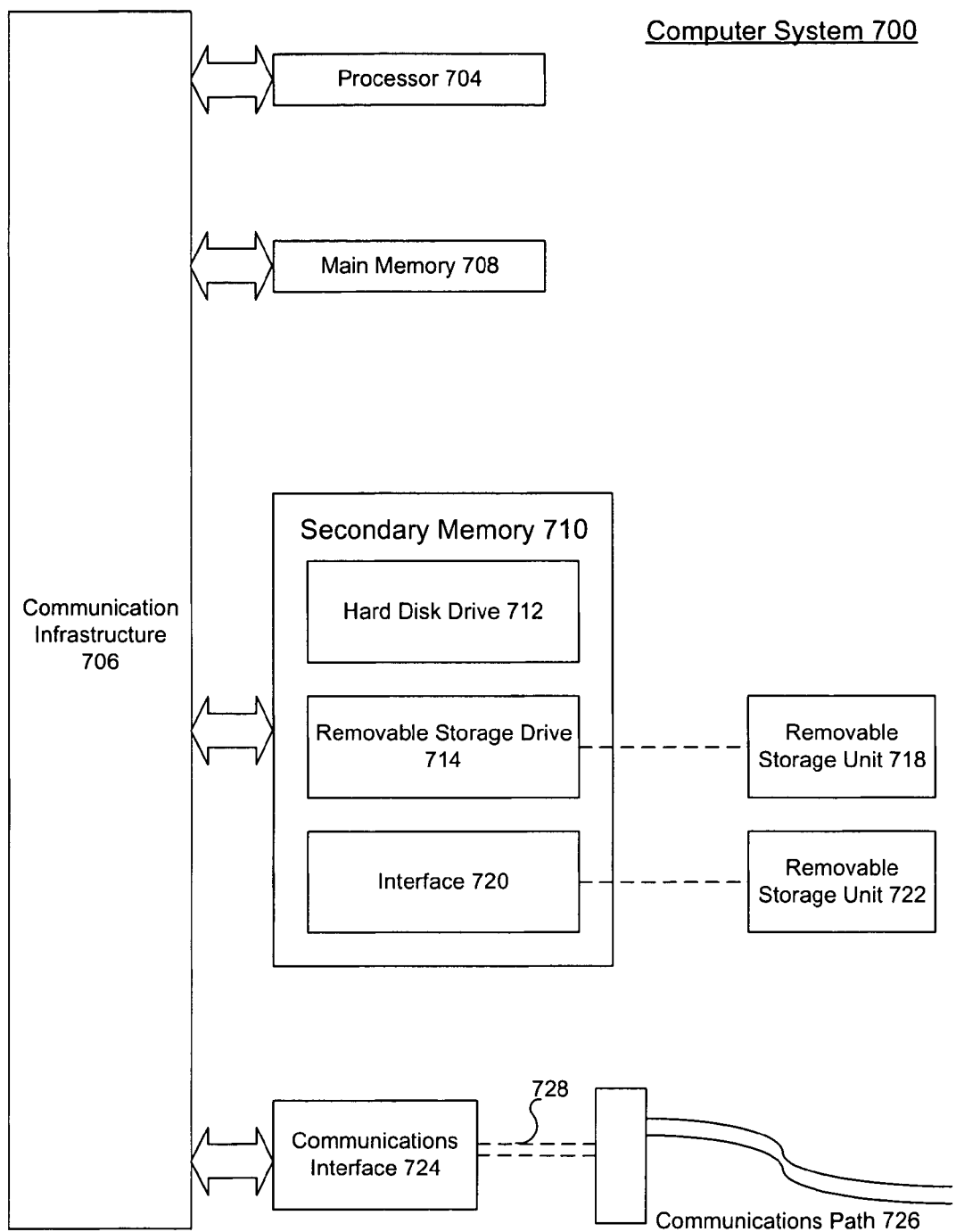
FIG. 7 is a block diagram illustration of an exemplary computer system on which the present invention can be practiced.

The present invention can be implemented in hardware, software, firmware, and/or combinations thereof. Consequently, the invention may be implemented in the environment of a computer system or other processing system. An example of such a computer system 700 is shown in FIG. 7.

The computer system 700 includes one or more processors, such as a processor 704. The processor 704 can be a special purpose or a general purpose digital signal processor. The processor 704 is connected to a communication infrastructure 706 (for example, a bus or network). Various software implementations are described in terms of this exemplary computer system. After reading this description, it will become apparent to a person skilled in the relevant art how to implement the invention using other computer systems and/or computer architectures.

The computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. The removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative implementations, the secondary memory 710 may include other similar means for allowing computer programs or other instructions to be loaded into the computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and the other removable storage units 722 and the interfaces 720 which allow software and data to be transferred from the removable storage unit 722 to the computer system 700.

The computer system 700 may also include a communications interface 724. The communications interface 724 allows software and data to be transferred between the computer system 700 and external devices. Examples of the communications interface 724 may include a modem, a network interface (such as an Ethernet card), a communications port, a PCMCIA slot and card, etc. Software and data transferred via the communications interface 724 are in the form of signals 728 which may be electronic, electromagnetic, optical or other signals capable of being received by the communications interface 724. These signals 728 are provided to the communications interface 724 via a communications path 726. The communications path 726 carries the signals 728 and may be implemented using wire or cable, fiber optics, a phone line, a cellular phone link, an RF link and other communications channels.

In the present application, the terms "computer readable medium" and "computer usable medium" are used to generally refer to media such as the removable storage drive 714, a hard disk installed in the hard disk drive 712, and the signals 728. These computer program products are means for providing software to the computer system 700.

Computer programs (also called computer control logic) are stored in the main memory 708 and/or the secondary memory 710. Computer programs may also be received via the communications interface 724. Such computer programs, when executed, enable the computer system 700 to implement the present invention as discussed herein.

In particular, the computer programs, when executed, enable the processor 704 to implement the processes of the present invention. Accordingly, such computer programs represent controllers of the computer system 700. By way of example, in the embodiments of the invention, the processes/methods performed by signal processing blocks of encoders and/or decoders can be performed by computer control logic. Where the invention is implemented using software, the software may be stored in a computer program product and loaded into the computer system 700 using the removable storage drive 714, the hard drive 712 or the communications interface 724.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of he present specification is to be interpreted by the skilled artisan in light of the teachings and guidance presented herein, in combination of one of ordinary skill in the art.

What is claimed is:

1. A method for communicating audio comprising:
   communicating audio between an encoder and decoder using a 2-line serial multi channel audio interconnect data bus including only a first signal line and a second signal line;
   transmitting, by the encoder, audio information segments on the first signal line, each segment including (i) a format portion representative of audio format modes and (ii) a data portion having audio data corresponding to one or more of the format modes; and
   transmitting, by the encoder, a number of synchronization markers on the second signal line, each marker being representative of a timing of one of the audio information segments, a rate of the markers being independent of a system clock rate,
   wherein only the first signal line and the second signal line form the 2-line serial multi-channel audio interconnect data bus structured to communicate audio, the system clock not communicated via the 2-line serial multi-channel audio interconnect data bus.

2. The method of claim 1, wherein the audio data comprises a serial bit stream.

3. The method of claim 1, wherein the audio information segments are unmodulated.

4. The method of claim 1, wherein the audio information segments are representative of one or more audio channels.

5. The method of claim 1, wherein the format portion comprises a 32 bit data word.

6. The method of claim 1, wherein the format modes include at least one of a version number, an audio stream ID, an audio sampling rate, an audio format, and a sample width.

7. The method of claim 6, wherein the audio stream ID includes an indication of an intended recipient of one or more of the transmitted audio segments.

8. The method of claim 1, wherein the format modes are dynamic.

9. The method of claim 1, wherein the format modes are configured to vary from one information segment to another information segment.

10. The method of claim 1, wherein the synchronization markers include sync pulses.

11. The method of claim 10, wherein each sync pulse represents a start of transmission of one of the information segments.

12. A method for communicating audio comprising:
    communicating audio between an encoder and decoder using a 2-line serial multi channel audio interconnect data bus including only a first signal line and a second signal line;
    receiving, by the decoder, audio information segments on the first signal line, each segment including (i) a format portion representative of audio format modes and (ii) a data portion having audio data corresponding to one or more of the format modes; and
    receiving, by the decoder, a number of synchronization markers on the second signal line, each marker being representative of a timing of one of the audio information segments, a rate of the markers being independent of a system clock rate,
    wherein only the first signal line and the second signal line form the 2-line serial multi-channel audio interconnect data bus structured to communicate audio, the system clock not communicated via the 2-line serial multi-channel audio interconnect data bus.

13. The method of claim 12, wherein the audio information segments are unmodulated.

14. The method of claim 12, wherein the audio information segments are representative of one or more audio channels.

15. The method of claim 12, wherein the format portion comprises a 32 bit data word.

16. The method of claim 12, wherein each of the synchronization markers represents a start of reception of the one of the audio information segments.

17. A system for communicating audio, comprising:
    a 2-line serial multi-channel audio interconnect data bus configured to communicate audio, including only a first signal line and a second signal line;
    an encoder coupled to the 2-line serial multi-channel audio interconnect data bus and configured to transmit audio information segments on the first signal line, each segment including (i) a format portion representative of audio format modes and (ii) a data portion having audio data corresponding to one or more of the format modes,
    the encoder further configured to transmit a number of synchronization markers on the second signal line, each marker being representative of a timing of one of the audio information segments, a rate of the markers being independent of a system clock rate; and
    a decoder coupled to the 2-line serial multi-channel audio interconnect data bus and configured to receive the audio information segments on the first signal line,
    the decoder further configured to receive a number of the synchronization markers on the second signal line,
    wherein only the first signal line and the second signal line form the 2-line serial multi-channel audio interconnect data bus structured to communicate audio, the system clock not communicated via the 2-line serial multi-channel audio interconnect data bus.

* * * * *